E. S. BLAKE.
FEEDING-HOPPERS FOR PULVERIZING MACHINES.

No. 187,588. Patented Feb. 20, 1877.

Witnesses
Theo. H. Matthews,
P. B. Reilly.

Edward S. Blake, Inventor
By Connolly Bros & W. Tighe, Attorneys

UNITED STATES PATENT OFFICE.

EDWARD S. BLAKE, OF PITTSBURG, PENNSYLVANIA.

IMPROVEMENT IN FEEDING-HOPPERS FOR PULVERIZING-MACHINES.

Specification forming part of Letters Patent No. 187,588, dated February 20, 1877; application filed May 22, 1876.

*To all whom it may concern:*

Be it known that I, EDWARD S. BLAKE, of Pittsburg, in the county of Allegheny and State of Pennsylvania, have invented certain new and useful Improvements in Feeders for Pulverizing-Machines; and I do hereby declare the following to be a full, clear, and exact description of the invention, such as will enable others skilled in the art to which it pertains to make and use it, reference being had to the accompanying drawings, which form part of this specification, in which—

Figure 1:
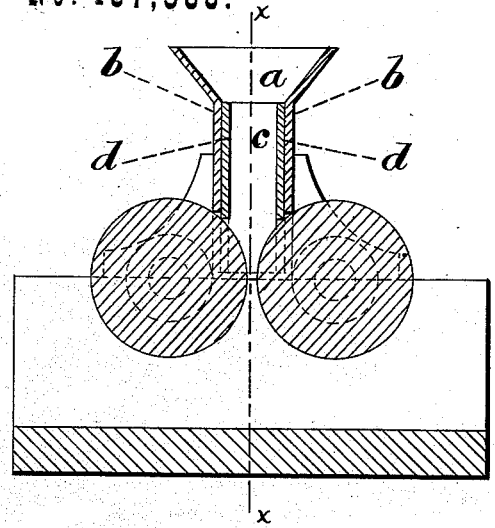
Figure 2:
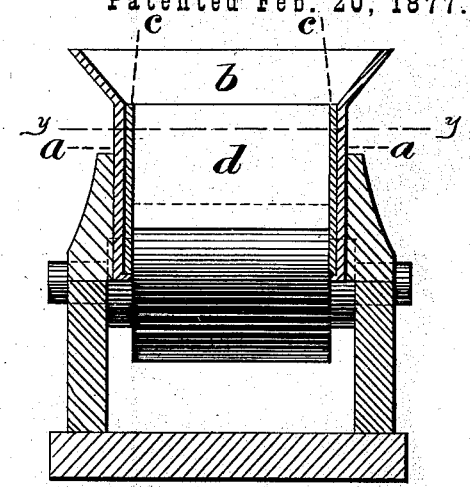
Figure 3:
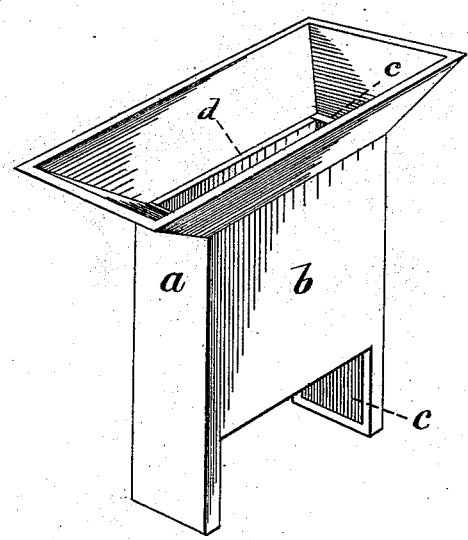
Figure 4:
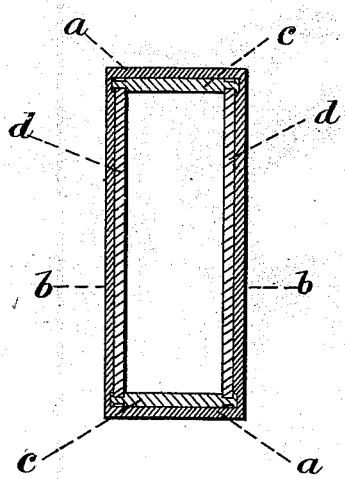

Figure 1 is a longitudinal vertical section. Fig. 2 is a transverse section on line $x\,x$ of Fig. 1. Fig. 3 is a perspective of the feeder. Fig. 4 is a horizontal section of feeder on line $y\,y$ of Fig. 2.

This invention relates to hoppers or feeders for pulverizing-machines, and similar devices using rolls; and consists in providing the feeder with interior interchangeable reversible and removable wearing-plates at the sides and ends, as and for the purpose hereinafter specified.

I make the feeder so that its ends $a$ shall continue vertically downward to lap the ends of both rolls, and leave just enough room for the interior plates. The sides $b$ of the feeder extend down almost to the surface of the rolls. On the inside are grooves, into which vertically slide the wearing end plates $c$, and in similar grooves, in plates $c$, slide the side plates $d$, or vice versa. The plates are grooved on both faces, and are the same width and thickness throughout, so that it matters not which end or side is turned up or out. Then the end plates are pushed down, so as to lap the ends of the rolls like the usual collar, and in a similar manner escape of material is prevented. The plates $c$ and $d$, being alike in both faces, are reversible, and, being respectively commensurate, they are interchangeable, while all are removable, to be replaced when worn out. Since the plates $c$ and $d$ receive all the wear, the casing may last an indefinite time, and the rolls need be stopped for but a few moments in order to give them a practically new feeder.

The advantage is greater, when it is considered that a solid feeder, by reason of a defect in the iron, may have a soft spot, which will be the first to wear out and render the whole unfit for use—an accident which my invention renders impossible.

Again, since the rolls gradually diminish in diameter as they wear out, a solid feeder would leave an opening under its sides for the escape of material. But in mine the side plates $d$ may be pushed down to take up the inevitable wear of the rolls.

Having fully described my invention, what I claim, and desire to secure by Letters Patent, is—

The combination, with a hopper constructed substantially as described, of the removable and reversible wearing-plates, substantially as specified.

In testimony that I claim the foregoing I have hereunto set my hand this 18th day of May, 1876.

EDWARD S. BLAKE.

Witnesses:
 SAMUEL ANDERSON,
 THOS. J. McTIGHE.